US009534500B2

(12) United States Patent
Bouchard et al.

(10) Patent No.: US 9,534,500 B2
(45) Date of Patent: Jan. 3, 2017

(54) SEAL ARRANGEMENT FOR SEGMENTED GAS TURBINE ENGINE COMPONENTS

(75) Inventors: Richard Bouchard, Sorel-Tracy (CA); John Pietrobon, Outremont (CA)

(73) Assignee: PRATT & WHITNEY CANADA CORP., Longueuil, QC (CA)

(*) Notice: Subject to any disclaimer, the term of this patent is extended or adjusted under 35 U.S.C. 154(b) by 37 days.

(21) Appl. No.: 13/094,916

(22) Filed: Apr. 27, 2011

(65) Prior Publication Data
US 2012/0274034 A1 Nov. 1, 2012

(51) Int. Cl.
*F16J 15/02* (2006.01)
*F01D 9/04* (2006.01)
*F01D 11/00* (2006.01)
*F16J 15/06* (2006.01)
*F16J 15/08* (2006.01)

(52) U.S. Cl.
CPC .............. *F01D 9/04* (2013.01); *F01D 11/003* (2013.01); *F16J 15/065* (2013.01); *F16J 15/0812* (2013.01); *F16J 15/0881* (2013.01); *F05D 2240/11* (2013.01); *F05D 2250/75* (2013.01)

(58) Field of Classification Search
USPC ................. 277/641, 648, 649, 650; 415/139
See application file for complete search history.

(56) References Cited

U.S. PATENT DOCUMENTS

| | | | |
|---|---|---|---|
| 3,728,041 A * | 4/1973 | Bertelson ....................... 415/189 |
| 3,752,598 A * | 8/1973 | Bowers et al. ................ 415/115 |
| 3,801,220 A * | 4/1974 | Beckershoff ............. 416/198 R |
| 4,500,098 A | 2/1985 | Wilcox et al. |
| 4,749,333 A | 6/1988 | Bonner et al. |
| 5,221,096 A * | 6/1993 | Heldreth et al. ............... 277/630 |
| 5,301,595 A * | 4/1994 | Kessie ................................ 87/6 |
| 5,975,844 A * | 11/1999 | Milazar et al. ............... 415/138 |
| 6,039,325 A | 3/2000 | Steinetz et al. |
| 6,086,329 A * | 7/2000 | Tomita et al. ............ 416/193 A |
| 6,609,886 B2 | 8/2003 | Aksit et al. |
| 6,733,234 B2 * | 5/2004 | Paprotna et al. ............. 415/138 |
| 6,857,639 B2 | 2/2005 | Beeck et al. |
| 6,883,807 B2 * | 4/2005 | Smed ........................... 277/644 |
| 7,217,081 B2 * | 5/2007 | Scheurlen et al. ................ 415/1 |
| 7,261,514 B2 * | 8/2007 | London et al. ............... 415/134 |
| 7,316,402 B2 * | 1/2008 | Paauwe ........................ 277/641 |
| 7,347,425 B2 | 3/2008 | James |
| 7,360,769 B2 * | 4/2008 | Bennett ......................... 277/641 |
| 7,527,472 B2 * | 5/2009 | Allen ............................ 415/139 |
| 7,562,880 B2 * | 7/2009 | Paprotna et al. ............. 277/644 |
| 7,901,186 B2 * | 3/2011 | Cornett et al. ............ 416/198 A |
| 8,016,549 B2 * | 9/2011 | Shah et al. .................... 415/134 |
| 8,210,799 B1 * | 7/2012 | Rawlings ..................... 415/135 |
| 2006/0038358 A1 | 2/2006 | James |
| 2006/0082074 A1 * | 4/2006 | Synnott et al. ............... 277/641 |
| 2010/0080699 A1 * | 4/2010 | Pietrobon et al. ............ 415/220 |
| 2010/0251687 A1 * | 10/2010 | Zborovsky et al. ......... 60/39.37 |

* cited by examiner

Primary Examiner — Eugene G Byrd
(74) Attorney, Agent, or Firm — Norton Rose Fulbright Canada LLP

(57) ABSTRACT

A seal arrangement for segmented turbine components comprises a sealing strip and a resilient cord element compressed against the strip to provide positive loading of the strip against the segment sealing faces. The sealing strip and the resilient cord element are engaged in confronting cavities defined in the end faces of adjacent segments. The resilient cord element is commonly held by both segments in a compressed state against the sealing strip.

17 Claims, 3 Drawing Sheets

SEAL ARRANGEMENT FOR SEGMENTED GAS TURBINE ENGINE COMPONENTS

TECHNICAL FIELD

The application relates generally to gas turbine engines and, more particularly, to a seal arrangement for sealing an inter-segment gap between two adjacent components.

BACKGROUND OF THE ART

A common approach to reduce gas leakage through inter-segment gaps between adjacent segments of segmented gas turbine engine components, such as circumferentially segmented turbine vane array, consist of inserting a thin sealing strip into machined grooves defined in the adjacent end surfaces of the segments. These thin sealing strips are referred to as feather seals. One problem with such feather seals is that they rely on the pressure delta across them to energize their firm contact against the segment sealing faces. Accordingly, under low pressure delta, these seals tend to not perform adequately. On the other hand, the high pressure delta needed to allow them to function can lead to other leakage problems.

It has also been proposed to spring load seals against the sealing faces. According to this approach, resilient sealing elements, such as dog-bone seals, are press fit into the adjoining grooves of adjacent segments. However, with today's complex segment axial profiles, it is challenging to obtain uniform sealing contact along all the length of grooves when using such resilient sealing elements. Known resilient sealing arrangements are also prone to assembly problems.

Accordingly, there is a need to provide a new inter-segment gap sealing arrangement.

SUMMARY

In one aspect, there is provided a seal arrangement for segmented gas turbine engine components, the seal arrangement comprising: a segmented annular component having at least two circumferentially adjacent segments having opposed end faces spaced by a generally axially extending gap, each end face having a cavity facing a corresponding cavity in the end face of the adjacent segment, each cavity being bounded in a radial direction by radially opposed hot and cold side surfaces, a sealing strip made from a heat resistant material received in the cavities and spanning the generally axially extending gap between the adjacent segments, the sealing strip having opposed hot and cold facing sides, and a resilient cord element extending along an axial length of the sealing strip and engaged with both circumferentially adjacent segments, the resilient cord being compressed against the cold facing side of the sealing strip and the cold side surfaces of the cavities of both circumferentially adjacent segments, the resilient cord radially urging the hot facing side of the sealing strip against the hot side surfaces of the cavities.

In a second aspect, there is provided a seal arrangement for restricting fluid leakage through a gap between opposed end faces of two circumferentially adjacent segments of a gas turbine engine component, the seal arrangement comprising: a cavity defined in the end face of each of the circumferentially adjacent segments, the cavities facing each other and opening to the gap, each cavity being bounded in a radial direction by radially opposed first and second surfaces, a sealing strip extending across the gap, the sealing strip being received at opposed longitudinal side portions thereof in the cavities of the circumferentially adjacent segments, and a resilient cord element commonly held by the second surfaces of the circumferentially adjacent segments in a compressed state against the sealing strip, the resilient cord positively radially loading the sealing strip against the first surfaces of the cavities of the circumferentially adjacent segments.

DESCRIPTION OF THE DRAWINGS

Reference is now made to the accompanying figures, in which.

DETAILED DESCRIPTION OF THE PREFERRED EMBODIMENTS

Figure 1:
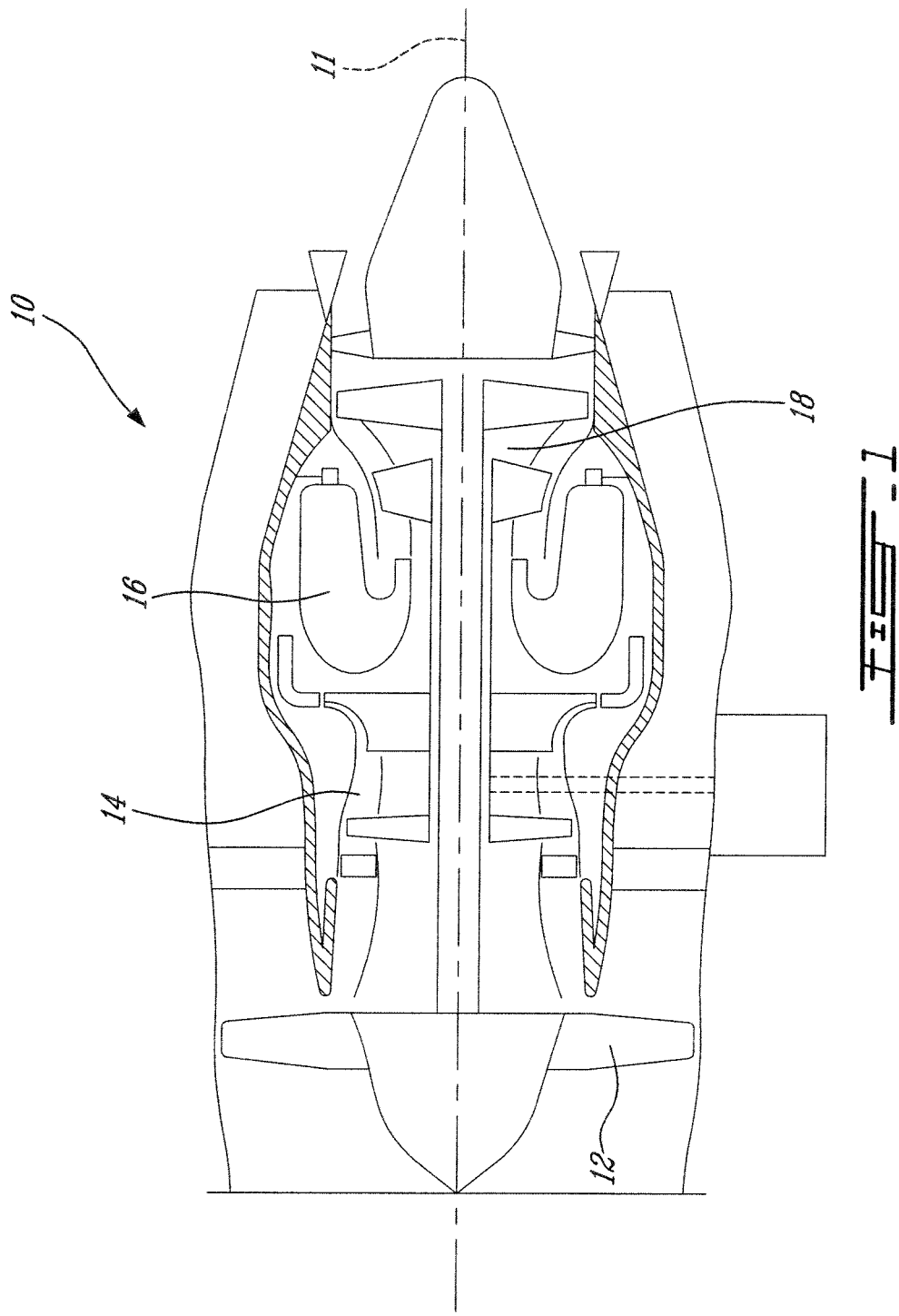
FIG. 1 is a schematic cross-sectional view of a turbofan gas turbine engine, taken along a centerline axis of the engine.

FIG. 1 illustrates a turbofan gas turbine engine 10 of a type preferably provided for use in subsonic flight, generally comprising in serial flow communication a fan 12 through which ambient air is propelled, a multistage compressor 14 for pressurizing the air, a combustor 16 in which the compressed air is mixed with fuel and ignited for generating an annular stream of hot combustion gases, and a turbine section 18 for extracting energy from the combustion gases.

Figure 2:
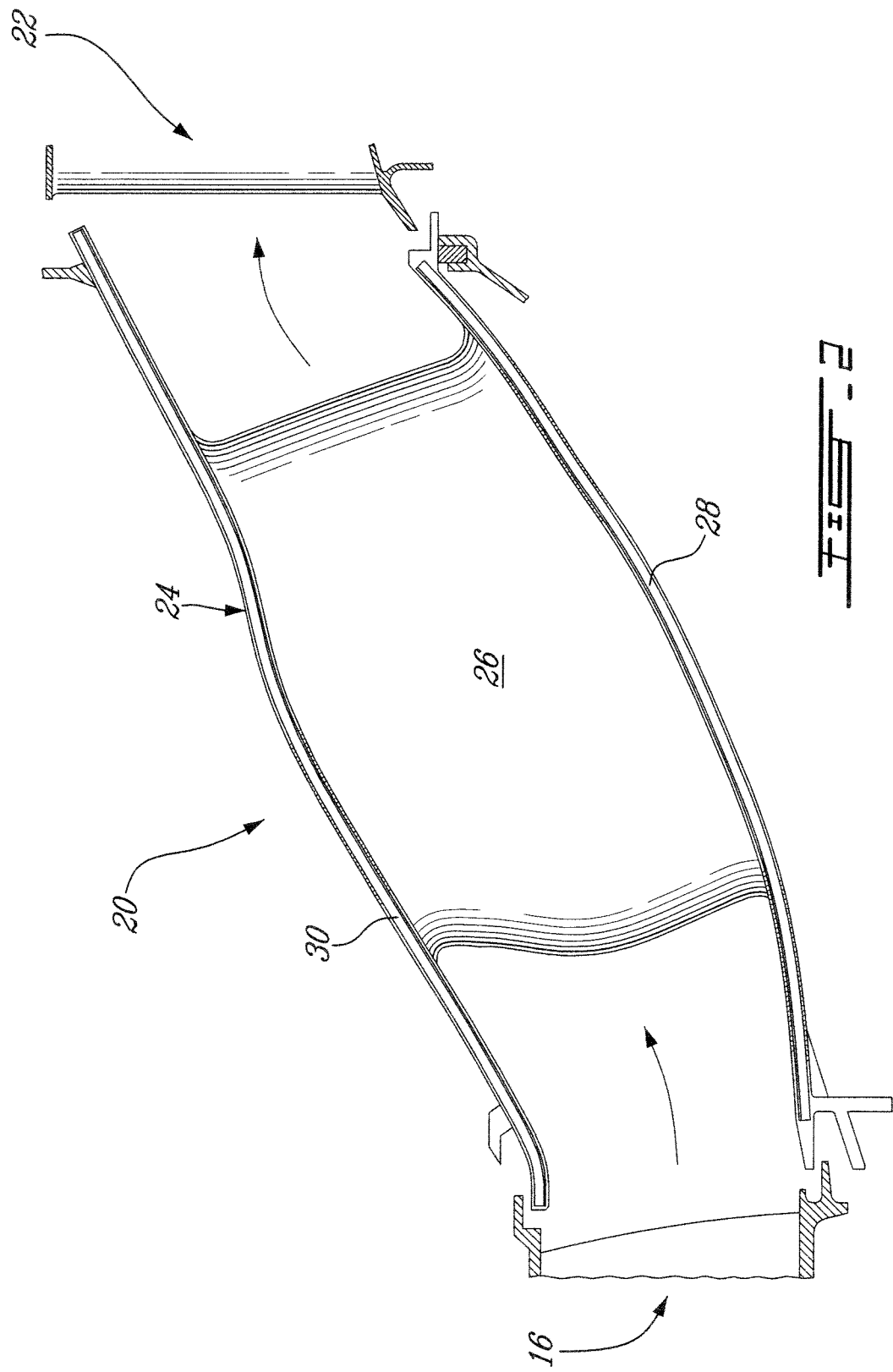
FIG. 2 is a schematic fragmentary cross-sectional view of a portion of the high pressure turbine section of the engine shown in FIG. 1, taken along the centerline axis of the engine.

As shown in FIG. 2, the gas turbine section 18 has a first stage of stationary vanes 20 disposed for channelling the combustion gases to a high pressure (HP) turbine rotor 22 mounted for rotation about a centerline axis 11 (FIG. 1) of the engine 10. The first stage of stationary vanes 20 is provided in the form a segmented vane ring to accommodate differential expansion during operation. Each vane segment 24 has one or more vanes 26 extending radially between inner and outer arcuate platforms 28 and 30 that define the radial flow path boundaries for the annular stream of hot combustion gases flowing through the vane ring. As can be appreciated from FIG. 2, the inner and outer platforms 28 and 30 may have a relatively complex axial profile to allow for different flow path diameters along the engine centerline axis 11. The more complex the axial profile is, the more challenging the inter-segment sealing is.

Figure 3:
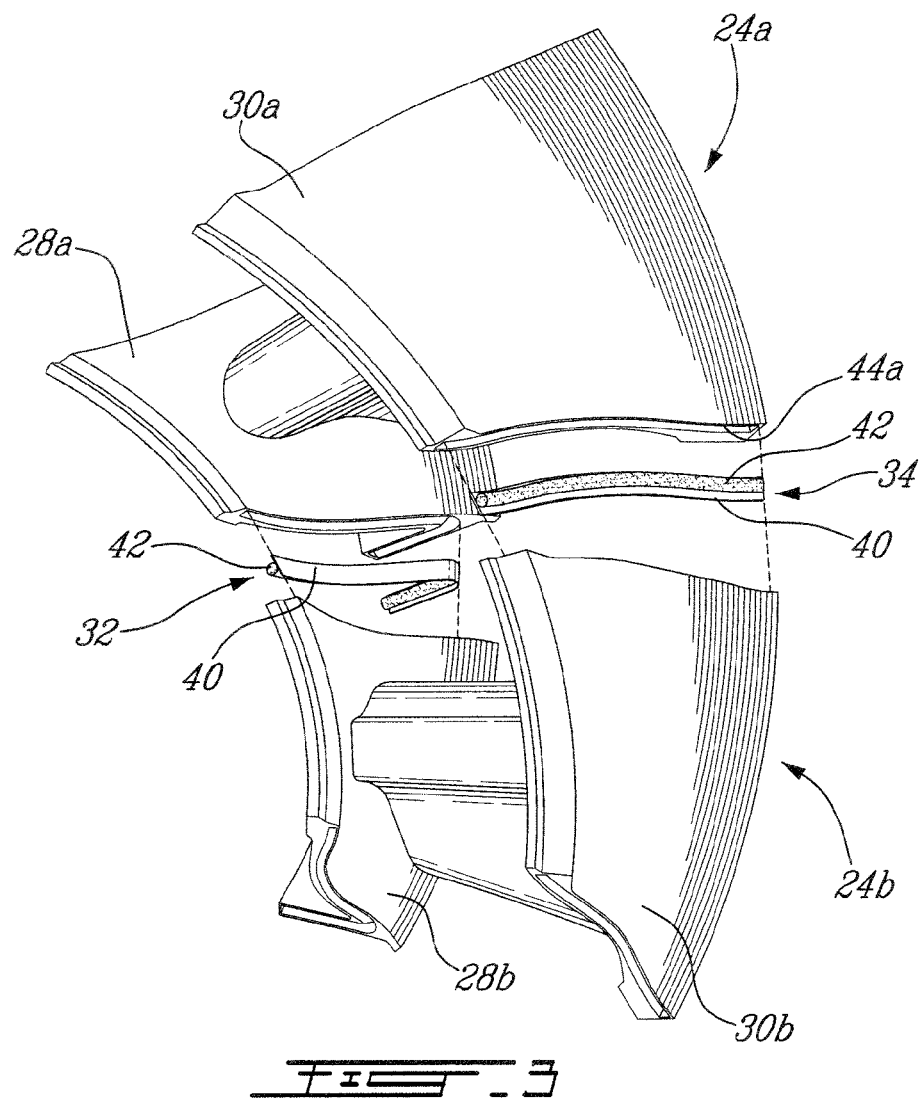
FIG. 3 is an exploded perspective view of two circumferentially adjacent turbine vane segments having an inter-segment seal arrangement according to an embodiment of the present invention.

As shown in FIG. 3, seal arrangements 32 and 34 are provided between the platforms 28a, 28b and 30a, 30b of circumferentially adjacent vane segments 24a and 24b to prevent the hot combustion gas from seeping radially out of the gas path into the engine interior. The inter-segment seal arrangements 32 and 34 also prevent high pressure cooling air circulated over the outer surfaces of the vane platforms from leaking radially into the gas path of the combustion gases.

Figure 4:
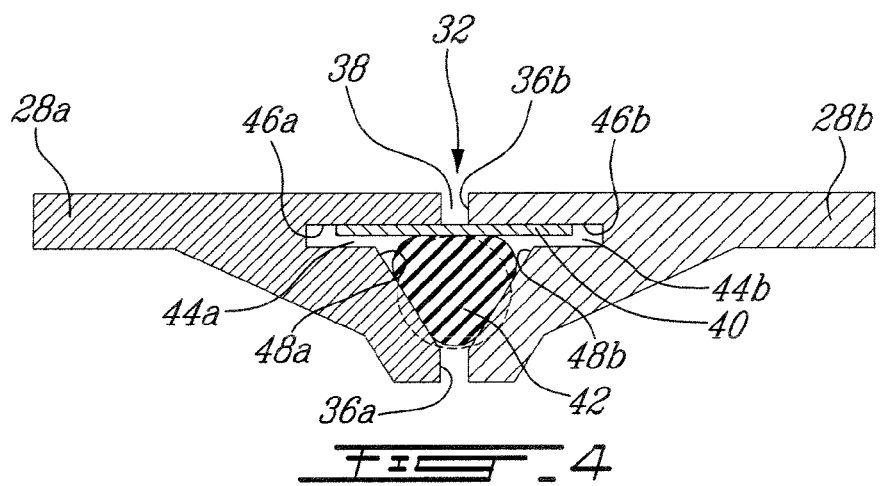
FIG. 4 is a sectional view of the seal arrangement between the inner platforms of the circumferentially adjacent vane segments, taken perpendicular to the centerline axis of the engine.

FIG. 4 shows in greater details the sealing arrangement for sealing the gap 38 between the opposed end faces 36a and 36b of adjacent inner platform segments 28a and 28b. It is understood that a similar sealing arrangement is provided between adjacent outer platform segments. The duplicate description thereof will be omitted for brevity purposes.

The sealing arrangement generally comprises a thin strip 40 of high temperature resistant material and a compliant or resilient cord element 42 adapted to be compressed against the strip 40 to provide positive loading of the sealing strip 40 against the segment sealing faces.

As shown in FIG. 4, each end face 36a, 36b has a cavity 44a, 44b facing a corresponding cavity 44a, 44b in the end face 36a, 36b of the adjacent platform segment. The cavities 44a, 44b extend axially from a front end to a rear end of the platform segments 28a, 28b (see FIGS. 2 and 3). The cavities 44a and 44b open to the inter-segment gap 38 for receiving the sealing strip 40 and the resilient cord element 42. The cavities 44a, 44b are respectively bounded in the radial direction by first and second surface 46a, 46b and 48a, 48b. The first surfaces 46a and 46b are located on the hot gas path side of the platform segments 28a and 28b, whereas the second surfaces 48a, 48b are located on the cooled side of the platform segments 28a and 28b. The first surfaces 46a and 46b offer a sealing face against which strip 40 may be loaded to seal the inter-segment gap 38. The second surfaces 48a, 48b are angled to each other to form a V-shaped seat for the resilient cord element 42. The second surfaces 48a, 48b diverge from each other towards the first side surfaces 46a, 46b (i.e. the V-shaped seat opens towards the first side surfaces 46a, 46b).

Once operatively installed, the sealing strip 40 extends across the gap 38 and is received along the opposed longitudinal side edge portions thereof in the facing cavities 44a and 44b of the platform segments 28a, 28b. The strip 40 may have a flat cross-sectional shape and be sized to be loosely positioned in the cavities 44a, 44b before being radially loaded against the sealing faces thereof by the resilient cord element 42. This facilitates the installation of the strips as for instance compared to dog bone seals having longitudinal side portions which must be radially compressed in the cavities. The strip 40 is adapted to be shaped or deformed to follow or embrace the axial profile of the sealing faces (i.e. the first side surfaces 46a, 46b) of the platform segments 28a, 28b. The strip 40 may be made of a malleable heat resistant material to permit easy shaping thereof. According to one example, the strip 40 may be made of a heat resistant metal, such as a cobalt alloy.

The resilient cord element 42 may be provided in the form of a compliant fibrous cord having the quality of yielding to bending under stresses within the elastic limit and which also has the capacity to withstand high temperatures. The resilient cord element 42 may have a fibrous core surrounded by a refractory metallic braid. An example of a suitable resilient cord would be an Inco braid-like cord having a core containing silicon carbide fibers and a surrounding metallic braid having Iconel cross-woven strands. The resilient cord element 42 has a length corresponding to the length of the cavities 44a and 44b and, thus, the strip 40. The resilient cord element 42 may have a circular cross-section which is sized so that the cord element 42 be held in a compressed states when positioned between the strip 40 and the second side surfaces 48a, 48b of the platform segments 28a, 28b (see the pre-constrained shape illustrated in broken lines in FIG. 4 relative to the post-constrained shape which is shown in full lines in the very same Figure). The V-shaped seat formed by second side surfaces 48a, 48b positions the resilient cord element 42 generally centrally relative to the strip 40. According to the illustrated arrangement, the cord element 42 is generally centrally disposed in the gap 38 between the end faces 36a, 36b of the adjacent platform segments 28a, 28b. That is the resilient cord element 42 projects outwardly from the cavities 44a, 44b defined in the end faces 36a, 36b and is in contact with both platform segments 28a, 28b.

When installed in position as shown in FIG. 4, the resilient cord element 42 is compressed against both second surfaces 48a. 48b and the cold facing side of the sealing strip 40. The resilient cord element 42 tends to regain its original pre-constrained shape, thereby positively urging the strip 42 in sealing contact against the first side surfaces 46a, 46b of the cavities 44a, 44b. The loading of the sealing strip against the sealing faces of the cavities by the resilient cord provides adequate sealing irrespectively of the fluid pressure delta between the hot gas path and the cooling path of the engine 10.

In operation, the thermal expansion of the vanes segments will tend to close the gap 38 between the segments. When the platform segments 28a and 28b are subject to such relative movements, the inclined or angled second surfaces 48a, 48b will cause the resilient cord element 42 to be further pushed against the strip 40, thereby ensuring improved sealing contact between the strip 40 and the first side surfaces 46a, 46b.

The loading of the strip 40 by the resilient cord element 42 allows the possibility that the inner surfaces of the cavities 44a and 44b, including surfaces 46a, 46b, 48a, 48b, could be "as-cast", without the need for further machining of theses surfaces after casting to provide appropriate sealing faces. This constitutes a benefit from a manufacturing point of view (cost and lead-time reduction).

The above sealing strip and resilient cord arrangement provides a sealing feature which conforms to intricate segment axial profile. It also simplifies the installation of the inter-segment seals. The strip 40 can be simply loosely positioned in the cavities 44a, 44b of adjacent segments and then the resilient cord element 42 can be axially run through the inter-segment gap to bias the strip 40 against the sealing faces of the cavities.

The above described sealing arrangement is economical since it may be composed of simple and readily available components (a thin metal strip and a compliant fibrous cord).

The above description is meant to be exemplary only, and one skilled in the art will recognize that changes may be made to the embodiments described without departing from the scope of the invention disclosed. For example, although the seal arrangement has been described in the context of segmented turbine vane, it will be appreciated that a sealing arrangement in accordance with the present invention may be employed in other assemblies of a gas turbine engine. For instance, it could be used to provide sealing between adjacent turbine shroud segments of a stage of rotor blades. It is also understood that the cavities in the end face of the adjacent segments may adopt various configurations. The sealing strip does not need to have a flat cross-section; it could have any suitable shape. It is also understood that the term "axial" is herein intended to broadly refer to a direction which has a major component parallel to the centerline axis of the engine. It is not to be limited to a strictly axial direction per se. Still other modifications which fall within the scope of the present invention will be apparent to those skilled in the art, in light of a review of this disclosure, and such modifications are intended to fall within the appended claims.

What is claimed is:

1. A seal arrangement for segmented gas turbine engine components, the seal arrangement comprising: a segmented annular component having at least two circumferentially adjacent segments having opposed end faces spaced by a generally axially extending gap, each end face having a cavity facing a corresponding cavity in the end face of the adjacent segment, each cavity being bounded in a radial direction by radially opposed hot and cold side surfaces, a sealing strip made from a heat resistant material received in the cavities and spanning the gap between the adjacent segments, the sealing strip being urged to embrace the hot side surface along all of an axial length thereof, the sealing strip having opposed hot and cold facing sides, and an axially compliant resilient cord extending along the axial length of the sealing strip and engaged with both circumferentially adjacent segments, the resilient cord being disposed between opposed longitudinal side edges of the sealing strip in the gap, the resilient cord being compressed against the cold facing side of the sealing strip and the cold side surfaces of the cavities by both circumferentially adjacent segments and blocking the gap on a cold side thereof, the resilient cord radially urging the hot facing side of the sealing strip against the hot side surfaces of the cavities, the sealing strip blocking the gap on a hot side thereof to prevent ingress of hot combustion gas into the cavities.

2. The seal arrangement defined in claim 1, wherein the cold side surfaces of the cavities of the circumferentially adjacent segments are angled with respect to each other so as to form a central V-shaped seat for the resilient cord, the V-shaped seat opening towards the hot side surfaces of the cavities.

3. The seal arrangement defined in claim 1, wherein the cold side surfaces of the cavities of the circumferentially adjacent segments diverge from one another toward said hot side surfaces.

4. The seal arrangement defined in claim 1, wherein the cold facing sides of the cavities of the circumferentially adjacent segments form a generally V-shaped seat for the resilient cord.

5. The seal arrangement defined in claim 1, wherein the sealing strip is a metal strip having a flat cross-sectional shape, the metal strip being deformed along the length thereof to embrace the axial profile of the hot side surfaces.

6. The seal arrangement defined in claim 1, wherein the sealing strip is a heat resistant metal strip, and wherein the resilient cord comprises a fibrous core and a refractory metal outer braid.

7. The seal arrangement defined in claim 1, the sealing strip extending laterally from opposed sides of the resilient cord for engagement in the cavities.

8. The seal arrangement defined in claim 1, wherein the resilient cord spans the gap.

9. The seal arrangement defined in claim 1, wherein the resilient cord projects outwardly from the end faces of the circumferentially adjacent segments, the resilient cord being commonly held by the circumferentially adjacent segments.

10. A seal arrangement for restricting fluid leakage through a gap between opposed end faces of two circumferentially adjacent segments of a gas turbine engine component, the seal arrangement comprising: a cavity defined in the end face of each of the circumferentially adjacent segments, the cavities facing each other and opening to the gap, each cavity being bounded in a radial direction by radially opposed first and second surfaces, a sealing strip extending across the gap and embracing the first surface of each cavity of the circumferentially adjacent segments along the axial direction, and a resilient cord commonly held by the second surfaces of the circumferentially adjacent segments in a compressed state against the sealing strip, the resilient cord being axially compliant so as to follow the sealing strip and positively radially loading the sealing strip against the first surfaces of the cavities along all the axial length thereof and blocking the gap on a hot side thereof to prevent ingress of hot combustion gas into the cavities, wherein the resilient cord bears against the second surfaces of the cavities and blocks the gap on a cold side thereof.

11. The seal arrangement defined in claim 10, wherein the resilient cord is held in the gap between the end faces of the circumferentially adjacent segments.

12. The seal arrangement defined in claim 11, wherein the resilient cord projects outwardly from the cavities defined in the end faces of the circumferentially adjacent segments.

13. The seal arrangement defined in claim 12, wherein the second surfaces diverge from each other towards the first surfaces, thereby providing a V-shaped seat for the resilient cord.

14. The seal arrangement defined in claim 10, wherein the resilient cord and the sealing strip are co-extensive.

15. The seal arrangement defined in claim 10, wherein the sealing strip is a heat resistant metal strip, and wherein the resilient cord comprises a fibrous core and a refractory metal outer braid, the resilient cord being disposed on a cold facing side of the sealing strip.

16. The seal arrangement defined in claim 1, wherein at least the hot side surface of each cavity has a non-linear axial profile defining different flow path diameters along a centerline of the engine, the sealing strip being urged to embrace the non-linear axial profile of the hot side surface along all of the axial length thereof.

17. The seal arrangement defined in claim 10, wherein each cavity has a non-linear axial profile defining different flow path diameters along a centerline of the engine, the sealing strip embracing the non-linear axial profile of the cavities along the axial direction, the resilient cord being axially compliant so as to follow the non-linear axial profiles of the sealing strips and of the cavities.

* * * * *